US008493740B2

(12) United States Patent
Diep et al.

(10) Patent No.: US 8,493,740 B2
(45) Date of Patent: *Jul. 23, 2013

(54) COMPONENT RETENTION MECHANISM

(75) Inventors: Vinh H. Diep, Milpitas, CA (US); Giles Matthew Lowe, San Francisco, CA (US); Peter Russell-Clarke, San Francisco, CA (US); Phillip Satterfield, East Palo Alto, CA (US); Clark Everett Waterfall, Campbell, CA (US); Alex Chun lap Yeung, South San Francisco, CA (US)

(73) Assignee: Apple Inc., Cupertino, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/175,673

(22) Filed: Jul. 1, 2011

(65) Prior Publication Data
US 2011/0261530 A1    Oct. 27, 2011

Related U.S. Application Data

(63) Continuation of application No. 12/340,413, filed on Dec. 19, 2008, now Pat. No. 7,995,350.

(60) Provisional application No. 61/102,781, filed on Oct. 3, 2008.

(51) Int. Cl.
*H05K 5/00* (2006.01)
(52) U.S. Cl.
USPC ............................ 361/732; 361/747; 361/803
(58) Field of Classification Search
USPC ................. 361/728–732, 752, 796, 800–803, 361/807, 809, 810, 747; 312/223.1, 223.2
See application file for complete search history.

(56) References Cited

U.S. PATENT DOCUMENTS

| | | | |
|---|---|---|---|
| 5,914,854 A | 6/1999 | Holt | |
| 6,181,565 B1 * | 1/2001 | Schmitt et al. | 361/756 |
| 6,234,829 B1 | 5/2001 | Thomsen | |
| 6,425,778 B1 | 7/2002 | Haq et al. | |
| 6,461,169 B1 | 10/2002 | Harrison et al. | |
| 6,674,650 B1 * | 1/2004 | Davis et al. | 361/796 |
| 6,738,261 B2 * | 5/2004 | Vier et al. | 361/740 |
| 6,769,927 B2 | 8/2004 | Brewer | |
| 7,033,197 B2 | 4/2006 | Ling et al. | |
| 7,120,032 B2 * | 10/2006 | Lin et al. | 361/801 |

(Continued)

OTHER PUBLICATIONS

PCI Express Card Electromechanical Specification Revision 1.0a, Apr. 15, 2003.

*Primary Examiner* — Hung S Bui
(74) *Attorney, Agent, or Firm* — Womble Carlyle Sandridge & Rice LLP

(57) ABSTRACT

A component retention mechanism facilitates improved installation, retention and removal of hardware components (e.g., PCI cards) on a personal computer. The retention mechanism includes a locking component, support member, and release mechanism coupled to each other. The locking component can be a steel bar or other stiff item positioned proximate to multiple socket connectors on a circuit board. The locking component moves between unlocked and locked positions that mechanically and simultaneously unlock or lock in place multiple add-in cards inserted into the socket connectors. The support member moves and thereby facilitates movement of the locking component between locked and unlocked positions. The release mechanism facilitates movement of the support member and is actuated when a force is exerted by a user thereto. An associated slider housing coupled to the release mechanism and support member includes a fan, support shelves and a door that provides additional support to oversized PCI cards.

20 Claims, 6 Drawing Sheets

U.S. PATENT DOCUMENTS

| | | |
|---|---|---|
| 7,331,810 B2 | 2/2008 | Yang |
| 7,583,495 B2 | 9/2009 | Carnevali |
| 7,586,757 B2 * | 9/2009 | Zhang et al. .................. 361/802 |
| 7,715,209 B2 * | 5/2010 | Dai ................................ 361/801 |
| 7,995,350 B2 * | 8/2011 | Diep et al. .................... 361/732 |

* cited by examiner

COMPONENT RETENTION MECHANISM

CROSS REFERENCE TO RELATED APPLICATIONS

This application is a continuation of and claims priority to commonly owned and co-pending U.S. patent application Ser. No. 12/340,413, filed Dec. 19, 2008, which in turn claims priority to U.S. Provisional Patent Application No. 61/102, 781, filed Oct. 3, 2008, both of which are entitled "COMPONENT RETENTION MECHANISM," and both of which are incorporated herein by reference in their entireties and for all purposes.

TECHNICAL FIELD

The present invention relates generally to personal computing devices, and more particularly to the facilitation of increased modularity with respect to various components of such personal computing devices.

BACKGROUND

Sophisticated personal computers are developing at a rapid rate, and there is an ever-present demand for improved appearance, speed, functionality, and reliability in the newest personal computers. One area that sometimes lags behind in the field is the ability of users to have increased flexibility in upgrading and building their own personal computing systems. While various hardware components, such as monitors, speakers, printers, disk drives, hard drives, memory units, peripheral component interconnect ("PCI") cards, and the like tend to be easily interchangeable for a home user, other hardware components are not so modular. For example, many traditional home computers are manufactured with a central processing unit ("CPU") or two that tend to be permanently affixed to a backplane, motherboard or other base printed circuit board ("PCB") in the computer. Such an arrangement tends to represent the permanent "heart" of the personal computer, with any desire to upgrade the CPU(s) and/or base PCB usually requiring the acquisition of a new computer.

Another area where modularity can be somewhat difficult in personal computers is with respect to PCI card arrays. Many PCI cards have a retention tab integrated along one edge of the card that is used in conjunction with a board-side retention arm to lock the card in place on its respective PCB when installed. Such a retention tab and arm arrangement helps to keep the PCI card installed and in place during vibrations, drops, or other sudden movements of the computing system. In many instances, however, these manually operable retention arms are difficult to access for a user that wants to replace a single PCI card in a tightly arranged array of installed PCI cards. As such, users often must resort to removing one or more adjacent PCI cards in order to access the retention arm mechanism to unlock the PCI card that they actually want to replace. Such a process can be cumbersome and unduly lengthy, and can subject desired components that are installed but must be temporarily removed to unneeded wear and risks.

Another issue that arises as the modularity of a personal computer increases is the ability to measure accurately the temperatures of various internal computer components. For example, many hard drives and other basic items are permanently built into a respective motherboard/CPU arrangement. Under such circumstances, it is fairly easy to build in a permanent thermocouple or other temperature sensing arrangement to monitor the temperature of such permanently affixed hard drives and other items, such that appropriate application of fans and/or other cooling techniques can be applied as needed. A permanently installed temperature sensor can benefit from direct contact with the housing of an operating hard drive or other component, as will be readily appreciated. When such hard drives and other components are modular (i.e., removable and replaceable), however, then the ability to measure accurately the temperature of these devices is complicated.

While many designs for aiding in the modularity of personal computers have generally worked well in the past, there is always a desire to provide new and improved designs or techniques that result in even more modularity options for such personal computers. In particular, various desired improvements can include increased modularity for base CPUs and related components, easier removal and secure installation of PCI cards located within closely spaced arrays, and the ability to accurately measure the temperatures of removable components in personal computers, among other features and enhancements.

SUMMARY

It is an advantage of the present invention to provide improved features for a personal computer. These improvements can include an increased modularity for primary CPUs and related components in a personal computer, easier removal and secure installation of add-in cards located within closely spaced arrays and/or the ability to accurately measure the temperatures of removable components in personal computers, among others. This can be accomplished at least in part through the use of modular personal computer tower having removable and replaceable CPU/DIMM modules, a more comprehensive hardware component retention system, and/or temperature sensors that are spring loaded to facilitate direct contact with removable computer components. In particular, the more comprehensive hardware component retention system can include a locking component that is adapted to lock or unlock simultaneously a plurality of computer add-in cards or components.

In various embodiments of the present invention, a provided computer apparatus can include a plurality of socket connectors coupled to a circuit board, a locking component positioned proximate to the socket connectors, a support member coupled to the locking component, a slider housing coupled to the support member, and a release mechanism coupled to the slider housing. The plurality of socket connectors can be arranged in a pattern that is substantially parallel, wherein each of the plurality of socket connectors is adapted to mate with a computer add-in card, such as a PCI card. The locking component can be a bar or similar item, and can have a first locked position and a second unlocked position. The first locked position can simultaneously mechanically lock in place an add-in card that is inserted into any of the socket connectors by using a notch on the add-in card, and the second unlocked position can simultaneously mechanically unlock any and all add-in cards installed in any of the plurality of socket connectors. The support member coupled to the locking component can be adapted to move and thereby facilitate the movement of the locking component between the first locked position and the second unlocked position. The slider housing coupled to the support member can be adapted to slide and thereby facilitate the movement of the support member, with the slider housing being further adapted to provide additional support to one or more oversized PCI or other add-in cards inserted within one of the socket connectors when the locking component is in the first locked position. The release mechanism can be adapted to facilitate the locking of the slider housing into a locked position when the bar or other locking component is in its first locked position, and, when a positive force is exerted by a user on the release mechanism, to release the slider housing to be movable to an unlocked position that also results in the bar or other locking component being in its second unlocked position.

Various details of these embodiments can include the computer add-in cards comprising PCI cards and/or accelerated graphics port ("AGP") cards. In some embodiments, the circuit board can be a motherboard or back plane for an associated personal computer, and the device may include such a circuit board. The locking component can be a rigid bar that engages simultaneously a notch on each of the add-in cards. Such a rigid bar can be metallic, and can be made from stainless steel, for example. In some embodiments, the plurality of socket connectors and the locking component can be located on one side of the circuit board, and while the support member is located on an obverse side of the circuit board from the socket connectors and locking component. In this manner, one or more moving components can be located in a region that has less of an impact on the various components on and attached to the circuit board, such as the obverse side of a motherboard.

Various further details of these embodiments can relate to the slider housing, such as the presence of one or more cooling fans located within the slider housing. Such a cooling fan or fans can be adapted to cool one or more add-in cards when such card(s) are operational within the computer, such as when a card is installed in a socket connector on the circuit board. In addition, one or more support shelves can be located within the slider housing, with such a support shelf or shelves being adapted to provide further support to one or more oversized computer add-in cards that might be inserted into one of the socket connectors. Also, the slider housing can include a door or other front portion that provides additional support to oversized computer add-in cards inserted into one of the socket connectors when the locking component is in its first locked position, and wherein the door or front portion provides no support to the oversized computer add-in cards when the locking component is in its second unlocked position.

In further embodiments, which may include some or all details of any or all of the foregoing embodiments, a personal desktop computer can include an outer housing, input and output ports about the outer housing for a plurality of peripheral devices, a motherboard located inside the outer housing and adapted to facilitate various processing functions and communications between peripheral devices, storage units and processors, a hard drive in communication with the motherboard and adapted to store data thereon, a CPU/memory module coupled to the motherboard and adapted to perform core processing functions for the personal desktop computer, and mating electrical connectors on both of the motherboard and the CPU/memory module. The CPU/memory module can be readily removable and replaceable from the personal desktop computer without needing to remove or replace the motherboard or hard drive. The mating connectors can be adapted to facilitate communications between the motherboard and the CPU/memory module when the module is installed, and also to facilitate the ready decoupling of the CPU/memory module from said motherboard to facilitate the removal of the module from the personal desktop computer. Further, a dual core CPU can be used, and the module memory can be DIMM and/or any other suitable memory for use with a CPU.

In still further embodiments, which similarly can include some or all details of any or all of the foregoing embodiments, a computer apparatus can include a temperature sensor adapted to sense the temperature of an operating removable computer component, a communication link coupled to the temperature sensor, a support structure adapted to support and hold the temperature sensor within a personal computer, and a compressible spring coupled to both the support structure and the temperature sensor. The communication link can be adapted to facilitate the communication of a temperature read by the temperature sensor to a processor, and the support structure can be mounted within the personal computer proximate to the location for a removable computer component. Also, the compressible spring can be adapted to permit the movement of the temperature sensor when the removable computer component is installed or removed from the personal computer, wherein such movement results in the temperature sensor directly contacting the removable computer component when the removable computer component is installed within the personal computer.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes only, and serve to provide examples of possible structures and arrangements for the inventive card locking mechanisms for a personal computer provided herein. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to a personal computer having a component retention mechanism that streamlines the ability to install, secure and remove component cards to a board, such as, for example, an array of PCI cards to a motherboard. Various details can also include the use of a modular desktop personal computer that permits for greater ease in building original computing systems and replacing or upgrading various components thereof, as well as a more reliable way of monitoring temperatures on removable operating components, such as hard drives. Although the present disclosure refers primarily to personal desktop or "tower-type" computers for purposes of illustration, it is to be understood that the various inventive elements disclosed herein can also be applied to other types of computing devices and systems, as may be appropriate.

Computer Modularity

Figure 1A:
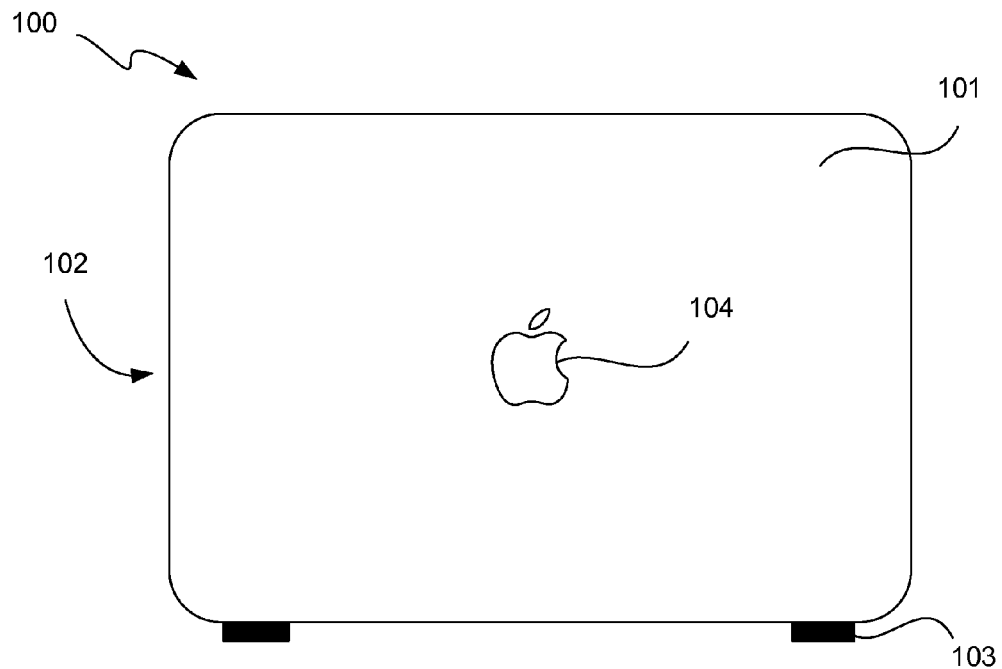
FIG. 1A illustrates in side elevation view an exemplary desktop personal computer according to one embodiment of the present invention.

Referring first to FIG. 1A, an exemplary desktop personal computer is illustrated in side elevation view. Personal computer 100 can include an outer housing 101, a front area 102 having one or more ports for peripheral devices, one or more shock absorbing pads or stands 103 and a logo or other mark 104. Personal computer 100 can be a tower-type computer that is common for personal use in home and office environments, and can have increased modularity over other computers.

Figure 1B:
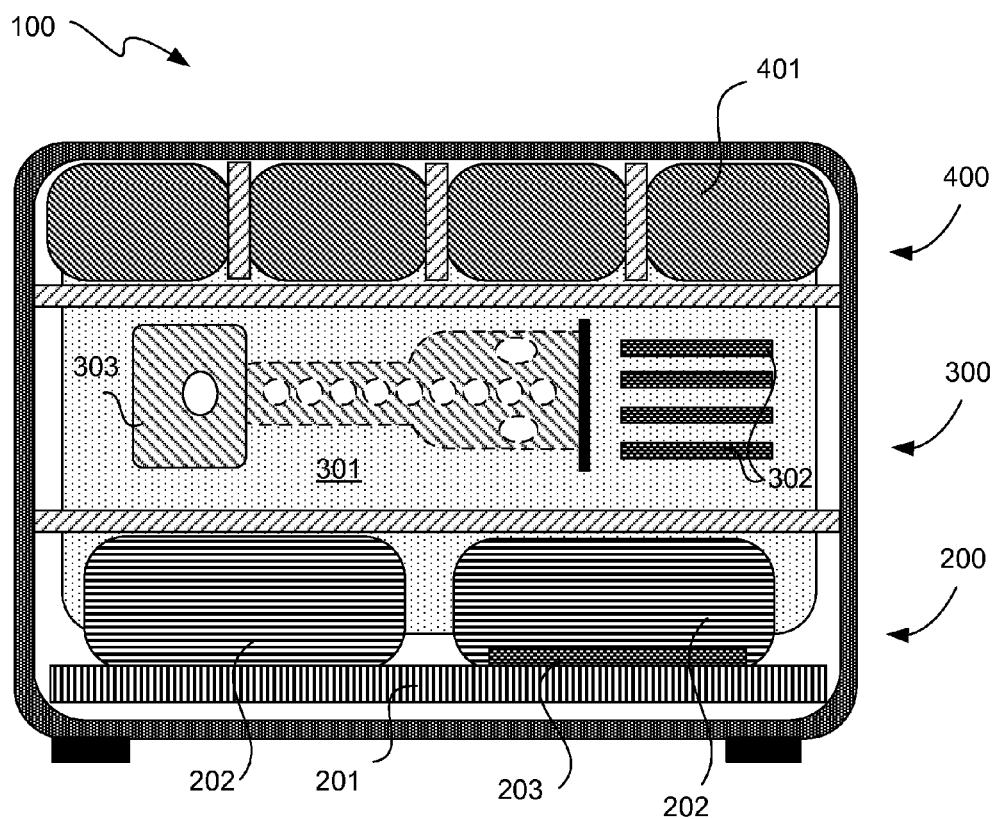
FIG. 1B illustrates in side elevation view the exemplary desktop personal computer of FIG. 1A with portions of the housing removed therefrom according to one embodiment of the present invention.

Continuing with FIG. 1B, the exemplary desktop personal computer of FIG. 1A is shown in side elevation view with portions of the housing removed therefrom according to one embodiment of the present invention. With at least a side panel removed to expose the interior of personal computer 100, three main internal regions 200, 300, 400 of the computer can be seen. CPU/DIMM module region 200 is the lowermost region, PCI zone 300 is the center region, and hard drive region 400 is the uppermost region of modular personal computer 100.

With respect to CPU/DIMM module 200, one or more trays or shelves 201 can be adapted to support and remove together with an entire core CPU and associated DIMM modular system 200, such that these components can be readily serviced, replaced and/or upgraded by a user, as may be desired. As shown, personal computer 100 comprises a dual core CPU system, with two CPUs 202 and a plurality of accompanying slots 203 for associated DIMM cards. The entire CPU and DIMM arrangement can be a single modular unit that pulls in and out of place from its respective region on personal computer 100. A suitable board and socket mating arrangement (not shown) can be utilized to mate the CPU/DIMM module 200 to a motherboard 301 or other primary circuit board, so as to facilitate communications between the CPU/DIMM module 200 and the rest of personal computer 100.

With respect to PCI zone 300, a plurality of PCI card slots or sockets 302 can be mounted to motherboard 301 or another circuit board in a suitable pattern, such as in a substantially parallel fashion. Motherboard or backboard 301 can be a primary circuit board for personal computer 100, and can extend into each of primary zones 200, 300, 400, as shown. Rather than utilizing a typical "hockey stick" plastic tab arrangement on each individual socket to lock an individually installed PCI card in place on a socket 302, a more comprehensive component retention mechanism 303 can be installed. Some portions of component retention mechanism can be positioned in front of motherboard 301, while other portions can reside behind the motherboard. In addition, component retention mechanism or system 303 can be used to lock and unlock all installed PCI cards simultaneously, such that the removal and installation of PCI cards is made easier than via traditional techniques.

With respect to hard drive region 400, one or more hard drives 401 or other large operational components can be located in an upper array. These hard drives 401 or other operational components can be modular in nature, such that they can be readily removed, serviced, replaced and/or upgraded, as may be desired by a user. Preferably, each hard drive 401 or other operational component can have a dedicated temperature sensor (not shown) that is adapted to accurately read and relay the temperature of the removable component, as set forth in greater detail below.

Figure 2:
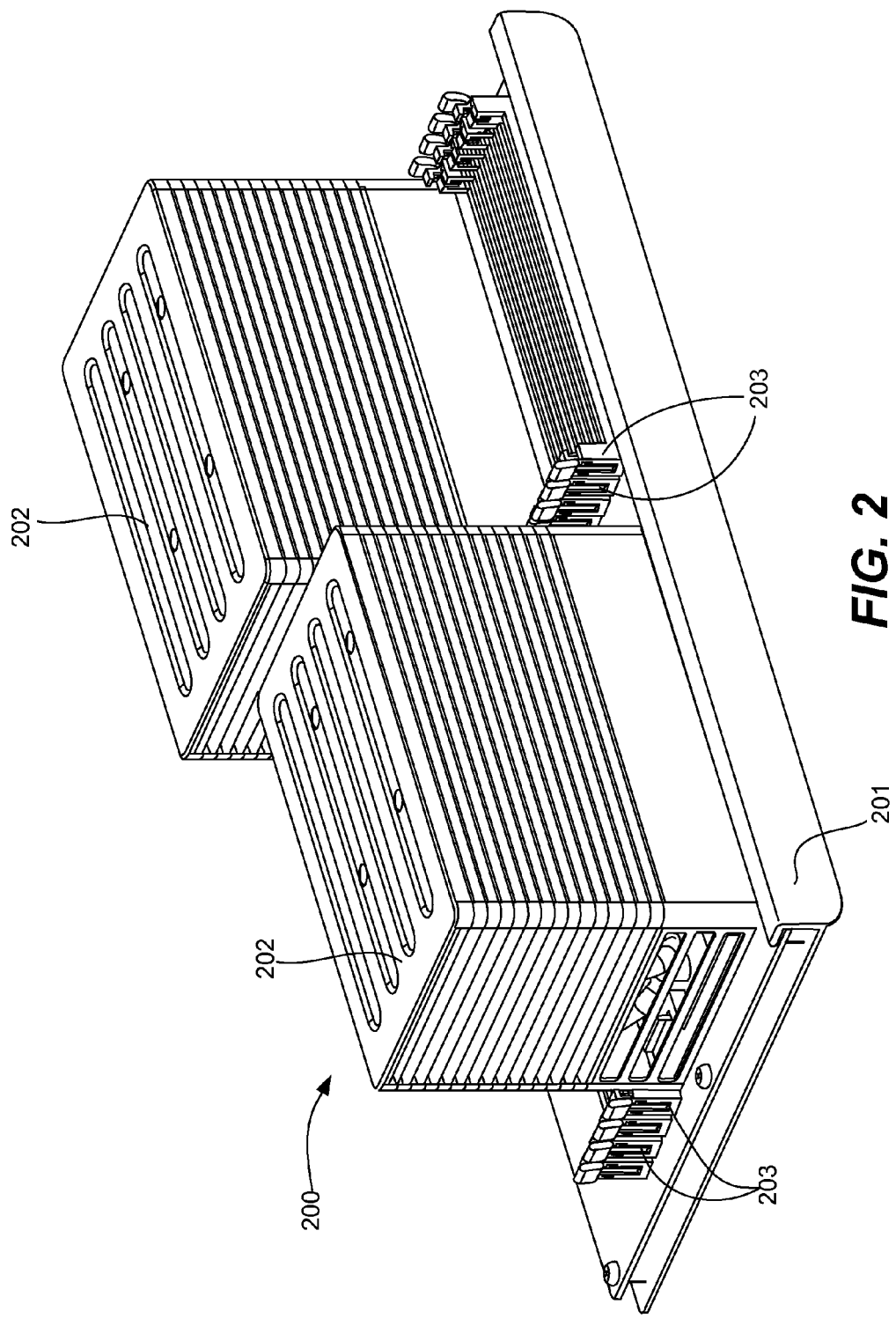
FIG. 2 illustrates in top perspective view an exemplary removable CPU/DIMM module according to one embodiment of the present invention.

FIG. 2 illustrates in top perspective view an exemplary removable CPU/DIMM module according to one embodiment of the present invention. As noted above, CPU/DIMM module 200 can have a tray, shelf or other support unit 201 adapted to organize the entire unit together as a removable module. Support unit 201 can include a circuit board to which the various CPU(s), memory unit(s) and/or other items can be attached. One or more CPUs 202 can be installed on the circuit board of support unit 201, and electrically connected to one or more memory card slots 203. As shown, each CPU 202 can have four associated memory card slots 203, into which various DIMM cards or other memory units can be installed. Of course, more or fewer than four memory slots per CPU can be included, as may be desired.

Add-In Card Locking Mechanism

Figure 3A:
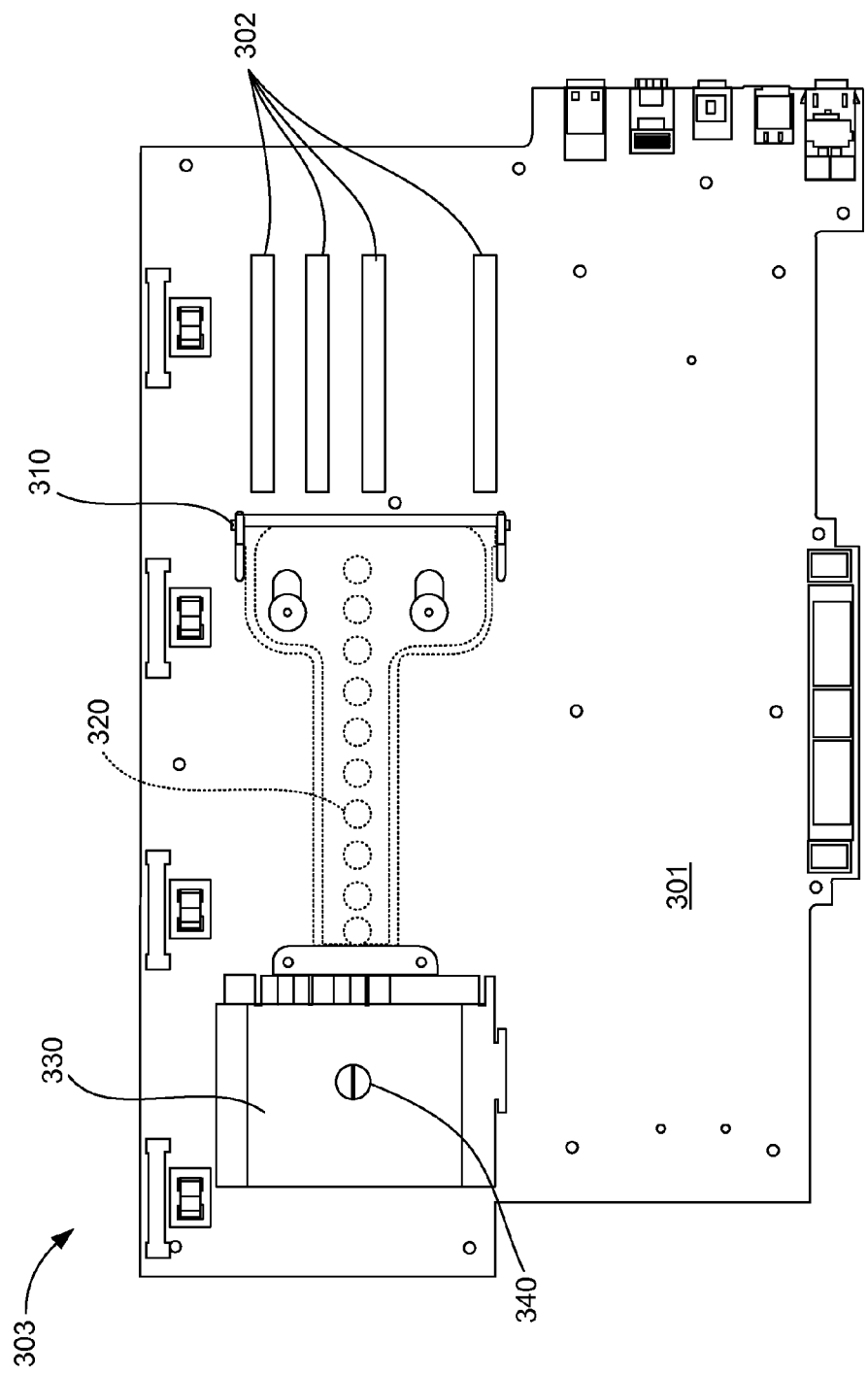
FIG. 3A illustrates in side elevation view an exemplary circuit board having a multiple component retention mechanism according to one embodiment of the present invention.
Figure 3B:
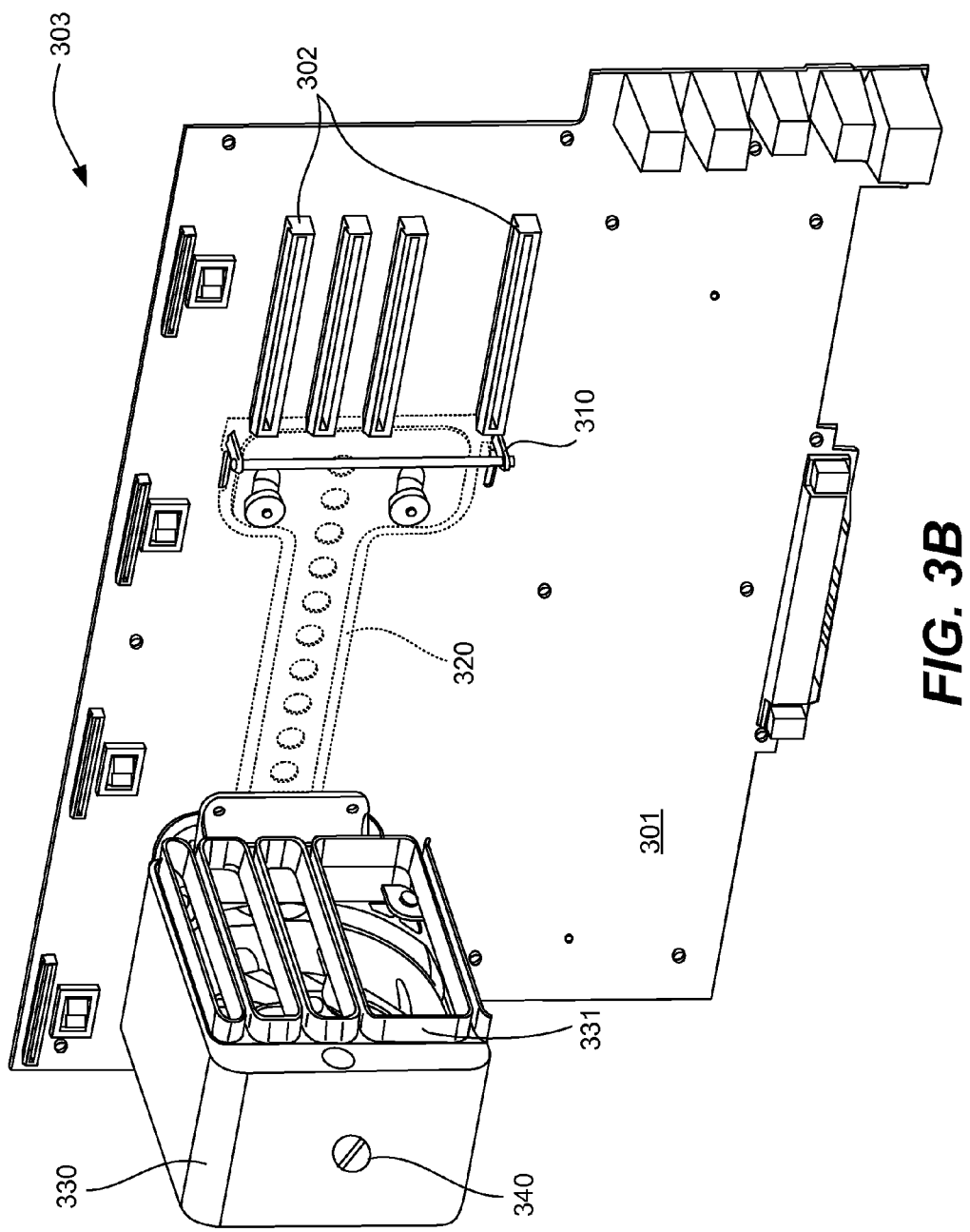
FIG. 3B illustrates in right side perspective view the exemplary circuit board having a multiple component retention mechanism according to one embodiment of the present invention.
Figure 3C:
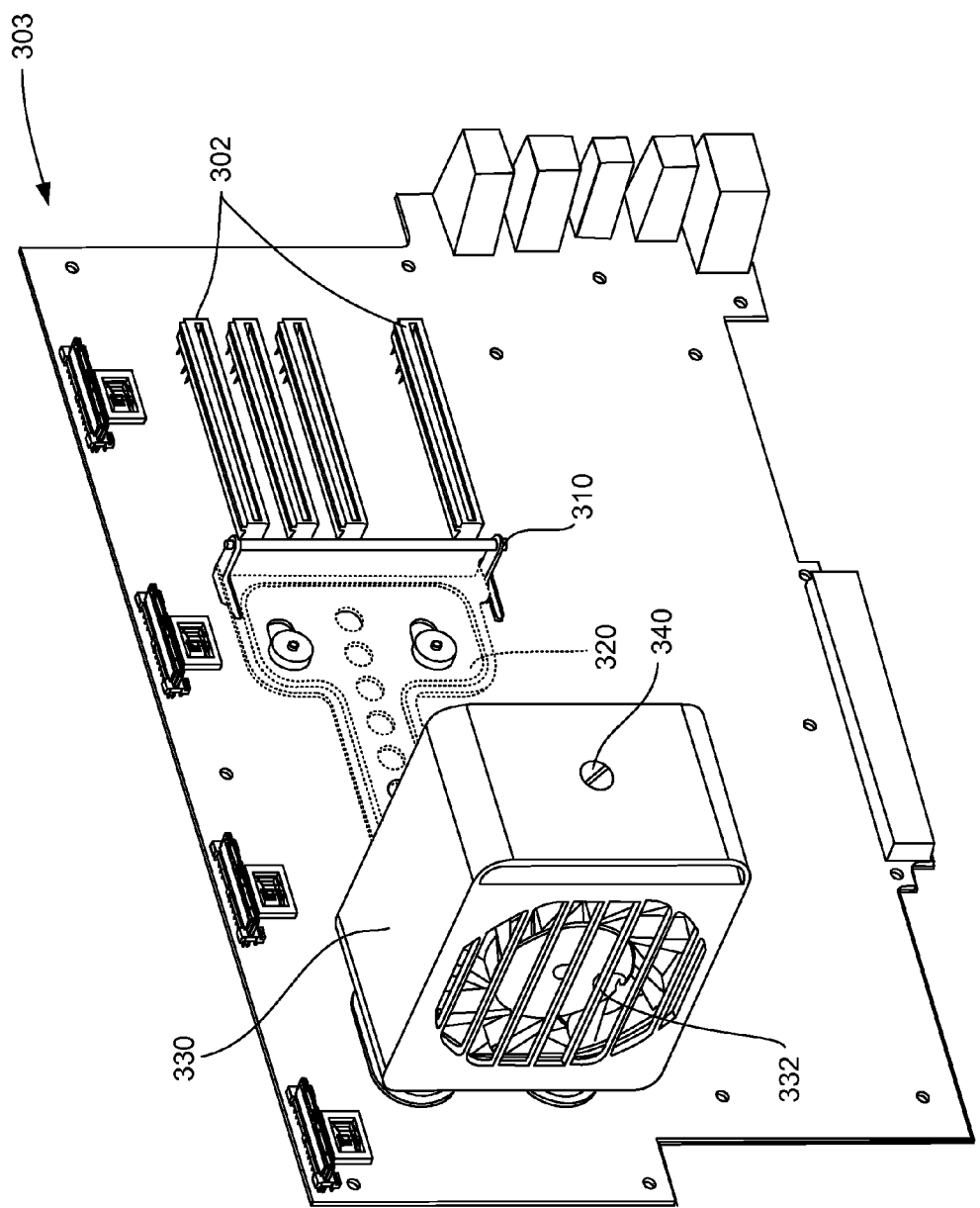
FIG. 3C illustrates in left side perspective view the exemplary circuit board having a multiple component retention mechanism according to one embodiment of the present invention.

Moving next to FIGS. 3A-3C an exemplary circuit board having a multiple component retention mechanism according to one embodiment of the present invention is illustrated in side elevation, right side perspective and left side perspective views respectively. Although the components being retained in the described examples are PCI cards, it is specifically contemplated that other suitable types of add-in cards or computer components can also be retained in a manner that is the same or similar to that which is provided herein. Again, circuit board 301 can be the motherboard, backboard or other primary circuit board for the personal computer disclosed herein. A plurality of interfaces or connectors, such as PCI or other add-in card type sockets or slots 302, can be arranged in a pattern, such as the parallel type arrangement shown. Rather than have an individual manually operated locking mechanism attached to each separate add-in card socket 302, a more comprehensive component retention mechanism 303 can be implemented.

As is generally known in the art, many add-in cards are manufactured according to standards that call out the use of integrated tabs or notches along the mating edge of the card. For example, various add-in card features and form factor standards are set forth in Section 6 of the "PCI Express Card Electromechanical Specification, Revision 1.0a, Apr. 15, 2003," which is incorporated by reference herein in its entirety. Additional instances of the use of add-in card notches to aid in retaining the card in place while installed can be found at, for example, U.S. Pat. No. 7,033,197, which is incorporated by reference herein in its entirety.

In general, these tabs or notches are used to lock the PCI card or other add-in card in place once it is installed, such that vibrations and sudden movements do not dislodge or misalign the mating connections between the card and the socket. Typical PCI card sockets have a plastic retaining arm or "hockey stick" type arrangement that individually locks each card in place to its respective socket. Each PCI card must be locked or unlocked individually by manually snapping into place or releasing this plastic tab, and the effort required to unlock a given card can often require one or more adjacent PCI cards to be unlocked and removed as well in order to provide access to the desired PCI card and socket. This is due to the fact that add-in cards are often arranged in arrays that provide little space to operate with respect to individual cards, with the arrangement shown in FIGS. 3A-3C being typical.

Component retention mechanism 303 can allow for the simultaneous locking and unlocking of any and all PCI cards that might be installed into any of the PCI card sockets 302 in the parallel pattern shown. Retention mechanism 303 includes a retention bar or other locking component 310, which can be attached or otherwise coupled to a support member, such as T-bar 320. Retention bar 310 can be formed from any stiff or otherwise supportive material, such as, for example, stainless steel. Other metals, hard plastics and/or other materials might also be used. As shown, support member or T-bar 320 can be located on an obverse side of circuit board 301 with respect to the card sockets 302 and locking component or retention bar 310. This allows for much of the lateral motion involved in locking and unlocking the add-in cards to be located in a region having fewer components or space constraints on the circuit board 301. As a result, retention bar 310 can be optimally positioned with respect to the card sockets 302, such that the retention bar can easily move between locked and unlocked positions with respect to any add-in cards that are installed in the sockets.

Bar or locking component 310 can be adapted to move back and forth between two positions—a first locked position, as shown, and a second unlocked position, which is to the left of the illustrated position. In the locked position shown, retention bar 310 is moved into the standard tab or notch that is integrated with any PCI card that might be installed into any of PCI sockets 302. When the attached or otherwise coupled T-bar 320 slides to the left, it moves retention bar 310 accordingly, which then repositions the bar in its unlocked position to the left of that which is shown. This unlocked position moves the bar out from the integrated tab or notch in any installed PCI cards, such that any or all cards can then be removed or installed, as may be desired. As will be appreciated, movement of retention bar 310 serves to lock or unlock all PCI cards simultaneously.

As shown in FIGS. 3A-3C, retention bar 310 is in its locked position, meaning that any add-in card having a standard card edge notch that is installed into any of sockets 302 would be locked into place by the retention bar. One or more slots or holes 304 in circuit board 301 permit arms or prongs 321 from T-bar 320 to extend from the obverse side of the circuit board through the board to hold the retention bar 310 in place. As will be readily apparent, slots or holes 304 can be adapted to permit lateral motion of prongs 321 and T-bar 320, such that the retention bar 310 can be moved away from sockets 302 to its unlocked position. One or more rivets or buttons 305 in the circuit board 301 can fit into sliding holes 322 on the T-bar 320, such that the T-bar is supported by the circuit board but is permitted to move in a lateral direction with respect to the array of sockets 302.

T-bar 320 is generally a support member that serves to translate motion from slider housing 330 to retention bar 310. In fact, as noted above, T-bar 320 can actually be positioned behind motherboard or back board 301, so as to be less obtrusive with respect to the various components that may be located on the front face of the board. In order to translate the motion to the retention bar 310 that is positioned a set distance away from the front face of motherboard 301, a pair of slots 304 in the circuit board 301 can allow a pair of connector arms 321 to couple the retention bar 310 to the T-bar 320. T-bar or support member 320 moves laterally in conjunction with slider housing 330 to which it is coupled, which slider housing can also be adapted to move laterally in the same general manner as the support member and the retention bar or other locking component.

Thus, support member 320 is coupled to retention bar 310 at one end of the T-bar, and also coupled to the slider housing 330 at the other end of the T-bar. A similar arrangement involving one or more slots or holes in the circuit board can allow for the coupling of the support member 320 to the slider housing 330, which slider housing is preferably on the front side of the circuit board 301. Although support member 320 is illustrated as having a "T-bar" type shape, it will be readily appreciated that many different suitable shapes and sizes of this component can be implemented for its designated purpose.

A button 340 or other release mechanism can provide a user with a way to manually operate the entire component retention mechanism 303 to lock or unlock all PCI or other add-in cards at once. Such a button or other release mechanism generally facilitates the mechanical locking of each of the moving components such that a positive mechanical force is needed to unlock and move the slider housing, support member and retention bar. For example, a simple mechanical actuation of the button by a user may suffice to unlock the entire mechanism and permit lateral movement of the coupled components. Button 340 can be located on the slider housing, as shown, although other suitable locations might alternatively be used.

Slider housing 330 can also be adapted to provide added support to oversized PCI cards, such that a traditional thumbscrew or other added support arrangement is not needed at the extended end of the card for added support. As shown in FIG. 3B, slider housing can contain a plurality of support shelves 331 therein, with such support shelves being adapted to receive the end of an oversized PCI card that is installed into one of the PCI card slots 302. When the front cover or "door" 333 of the slider housing 330 is open, an oversized PCI card can readily be installed into a PCI card slot 302 and also into a respective support shelf 331 within the slider housing 330. However, when the front cover of the slider housing 330 is moved shut when the entire retention mechanism 303 is in a locked position, this front cover closes off the frontal access to the support shelf 331, such that the front edge of the oversized PCI card is supported by the front cover of the slider housing. As such, each of retention bar 310, support shelf 331 and the front cover of slider housing 330 all provide support to an oversized PCI card when retention mechanism 303 is in locked position.

Additional components may also be included within the slider housing. As can be seen, one or more cooling fans 332 or other components may also be located within or about slider housing 330, as may be desired for a given design. Such a fan or fans can be adapted to provide cooling to one or more of the PCI or other add-in cards during their operation.

Temperature Sensors for Removable Components

Figure 4:
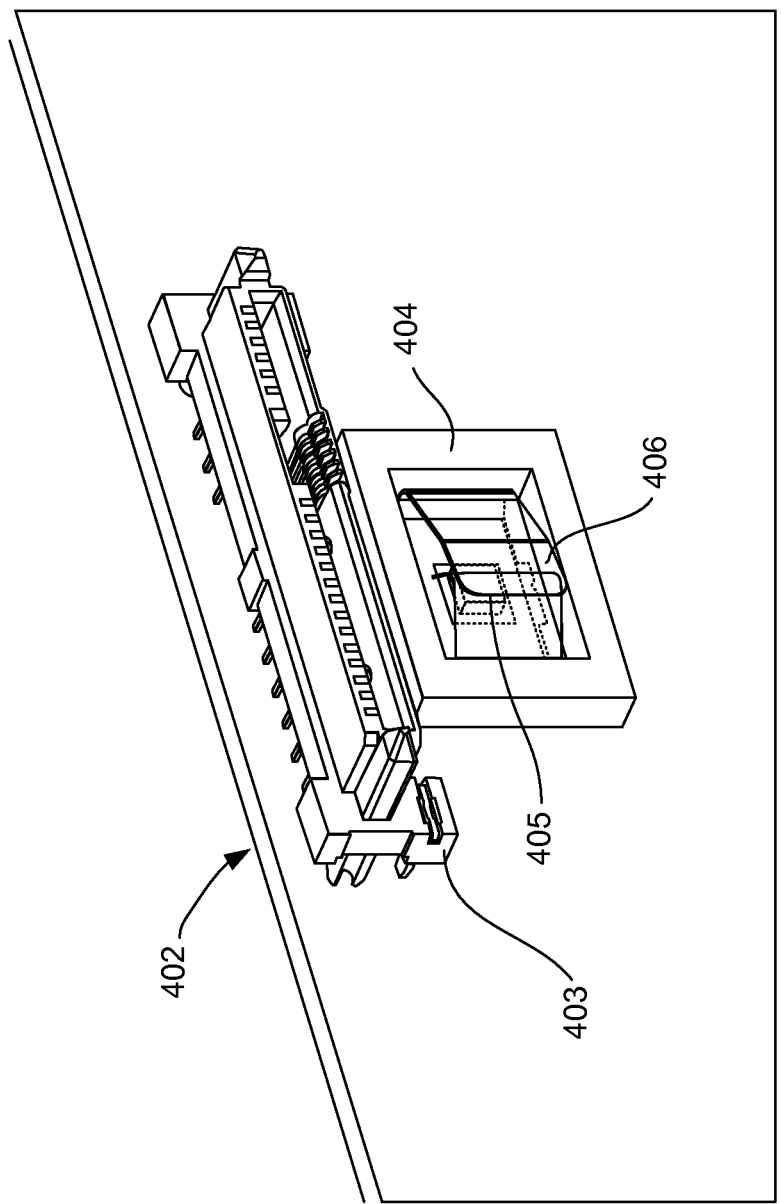
FIG. 4 illustrates in front perspective view an exemplary spring loaded temperature sensor according to one embodiment of the present invention.

Turning next to FIG. 4 an exemplary spring loaded temperature sensor according to one embodiment of the present invention is shown in front perspective view. Temperature sensor arrangement 402 is advantageously adapted for use with respect to a removable operational computer component, such that accurate temperature readings can be given. Accurate temperature readings for various operational computer components can be valuable where maximum efficiency is desired in the use of localized fans or other cooling methods. Such a removable operational computer component can be, for example, a removable hard drive.

This removable hard drive or other component (not shown) can mate with socket 403, which is proximate to the temperature sensing arrangement. A support structure 404 for a temperature sensor 405 can be installed near the mating socket 403. A compression spring 406 or other spring-like component can serve to provide a positive force to the temperature sensor, such that the temperature sensor or a direct thermal conduit thereof will directly contact the housing of the removable hard drive or other component when it is installed. Thus, the temperature of the actual component can be read directly regardless of variations in component size, unlike traditional unreliable approaches that simply read the ambient air near a removable operational computer component.

Although the foregoing invention has been described in detail by way of illustration and example for purposes of clarity and understanding, it will be recognized that the above described invention may be embodied in numerous other specific variations and embodiments without departing from the spirit or essential characteristics of the invention. For example, although many illustrations have pointed to the use of a steel bar as the locking component, many other metals or other similarly rigid materials may alternatively be used. Similarly, many different materials may also be used to form the support member, slider housing and/or release mechanism beyond those provided as examples herein, so long as such alternative materials are suitable for the intended purpose(s). Other changes and modifications may be practiced, and it is understood that the invention is not to be limited by the foregoing details, but rather is to be defined by the scope of the appended claims.

What is claimed is:

1. A computer apparatus, comprising:
a plurality of socket connectors coupled to a circuit board, wherein each of said plurality of socket connectors is adapted to mate with a computer add-in card;
a locking component comprising a retention bar positioned proximate to said plurality of socket connectors, said locking component having a first locked position wherein the retention bar is disposed at least partially within a plurality of notches located in a plurality of computer add-in cards and a second unlocked position that simultaneously unlocks each of the plurality of computer add-in cards inserted into said plurality of socket connectors by removing the retention bar from the plurality of notches; and
a release mechanism adapted to facilitate the locking of said locking component in the first locked position and to facilitate the release of said locking component to the second unlocked position.

2. The computer apparatus of claim 1, further comprising:
a support member coupled to said locking component, said support member adapted to move and thereby facilitate the movement of said locking component between the first locked position and the second unlocked position.

3. The computer apparatus of claim 2, further comprising:
a slider housing coupled to said support member, said slider housing being adapted to slide and thereby facilitate the movement of said support member.

4. The computer apparatus of claim 3, wherein said slider housing is adapted to provide additional support to an oversized computer add-in card inserted into one of said plurality of socket connectors when said locking component is in the first locked position.

5. The computer apparatus of claim 1, wherein said computer add-in cards comprise peripheral component interconnect cards.

6. The computer apparatus of claim 1, wherein said locking component comprises a rigid bar.

7. The computer apparatus of claim 1, wherein said locking component locks in place the plurality of computer add-in cards by using a notch on each of the plurality of computer add-in cards.

8. The computer apparatus of claim 1, wherein said plurality of socket connectors and said locking component are located on the same side of the circuit board.

9. A personal computing device, comprising:
an outer housing adapted to contain one or more internal operational components therein;
a plurality of internal operational components located within said outer housing and adapted to provide processing for a user thereof;
a processor located within said outer housing and in communication with at least one of said plurality of internal operational components;
a plurality of socket connectors coupled to a circuit board located within said outer housing, wherein each of said plurality of socket connectors is adapted to mate with a computer add-in card to facilitate communications between said computer add-in card and said processor; and
a locking component comprising a retention bar positioned proximate to said plurality of socket connectors, said locking component having a first locked position wherein the retention bar is disposed at least partially within a plurality of notches located in a plurality of computer add-in cards and a second unlocked position that simultaneously unlocks each of the plurality of computer add-in cards inserted into said plurality of socket connectors by removing the retention bar from the plurality of notches.

10. The personal computing device of claim 9, further comprising:
a release mechanism adapted to facilitate the locking of said locking component in the locked position and to facilitate the release of said locking component to the unlocked position.

11. The personal computing device of claim 9, further comprising:
a support member coupled to said locking component, said support member adapted to move and thereby facilitate the movement of said locking component between said first locked position and said second unlocked position.

12. The personal computing device of claim 11, further comprising:
a slider housing coupled to said support member, said slider housing being adapted to slide and thereby facilitate the movement of said support member, wherein said slider housing is also adapted to provide additional support to an oversized computer add-in card inserted into one of said plurality of socket connectors when said locking component is in the first locked position.

13. The personal computing device of claim 9, wherein said locking component locks in place the plurality of computer add-in cards by using a notch on each of the plurality of computer add-in cards.

14. The personal computing device of claim 9, wherein said personal computing device comprises a desktop computer, and wherein at least one of the plurality of computer add-in cards comprises a peripheral component interconnect card.

15. A method of increasing modularity for a computing device, comprising:
coupling a plurality of socket connectors to a circuit board at the computing device, wherein each of the plurality of socket connectors is adapted to mate with a computer add-in card;
positioning a retention bar proximate to the plurality of socket connectors such that the locking component includes a locked position wherein the retention bar is disposed at least partially within a plurality of notches located in a plurality of computer add-in cards and an unlocked position that simultaneously unlocks each of the computer add-in cards inserted into the plurality of socket connectors by removing the retention bar from the plurality of notches; and
providing a release mechanism that facilitates locking of the retention bar in the locked position and that facilitates release of the retention bar to the unlocked position.

16. The method of claim 15, further comprising:
coupling a support member to the retention bar, wherein the support member is adapted to move and thereby facilitate the movement of the retention bar between the locked position unlocked positions.

17. The method of claim 16, further comprising:
providing a slider housing coupled to both the support member and the release mechanism, wherein the slider housing is adapted to slide and thereby facilitate the movement of the support member, and wherein the slider housing is further adapted to provide additional support to one or more oversized computer add-in cards inserted into one or more of the plurality of socket connectors when the retention bar is in the locked position.

18. The method of claim 17, further comprising:
installing or more support shelves within the slider housing, wherein the one or more support shelves are adapted to provide further support to the one or more oversized computer add-in cards.

19. The method of claim 15, further comprising:
coupling a core CPU and associated memory modular system to a primary circuit board located within the computing device, wherein the core CPU and associated memory modular system is adapted to be readily removed from the computing device to be serviced, replaced, or upgraded in part or in its entirety.

20. The method of claim 15, further comprising:
coupling a modular hard drive to a primary circuit board located within the computing device, wherein the modular hard drive is adapted to be readily removed from the computing device to be serviced, replaced, or upgraded; and
providing a dedicated temperature sensor for the modular hard drive, wherein the dedicated temperature sensor is adapted to accurately read and relay the temperature of the modular hard drive.

\* \* \* \* \*